United States Patent [19]

Brouwer

[11] 4,189,018
[45] Feb. 19, 1980

[54] PULLEY AND TAPE MOTION LINKAGE FOR PLATFORM WEIGHING SCALE

[76] Inventor: Frans Brouwer, 410 Greenwood Ave., Glencoe, Ill. 60022

[21] Appl. No.: 962,326

[22] Filed: Nov. 20, 1978

[51] Int. Cl.² .......................................... G01G 21/02
[52] U.S. Cl. ............................ 177/256; 177/DIG. 9
[58] Field of Search ............... 177/DIG. 9, 256, 211, 177/210 C

[56] References Cited

U.S. PATENT DOCUMENTS

| 2,736,549 | 2/1956 | Paul | 177/DIG. 9 |
|---|---|---|---|
| 3,938,603 | 2/1976 | Shoberg | 177/DIG. 9 |
| 4,023,634 | 5/1977 | Provi | 177/DIG. 9 |
| 4,050,532 | 9/1977 | Provi | 177/DIG. 9 |

*Primary Examiner*—Joseph W. Hartary

[57] ABSTRACT

A platform weighing scale having a transducer with a movable element to translate weight responsive platform motion into a weight responsive electrical signal and in which the platform is movably supported relative a scale base by one or more pulley and tape motion linkages which also actuate the transducer element. The improved pulley and tape motion linkage comprising a pulley-like element having diametrically opposite peripheral circular sectors, a tape contacting the circular sectors and connected between the platform and base, a pair of restraining elements sandwiching the pulley-like element for a composite rotary and linear motion between parallel surfaces with the circular sectors contacting the parallel surfaces, an arm fixedly coupled to the pulley-like element at its center of rotation by which a remote segment of the arm follows an amplified composite linear and rotary motion, a second pulley-like element fixed to the remote segment of the arm and having a peripheral circular sector having the same center of rotation as the first pulley-like element, and a second tape contacting the second circular sector and connected between the arm and the movable element of the transducer.

9 Claims, 10 Drawing Figures

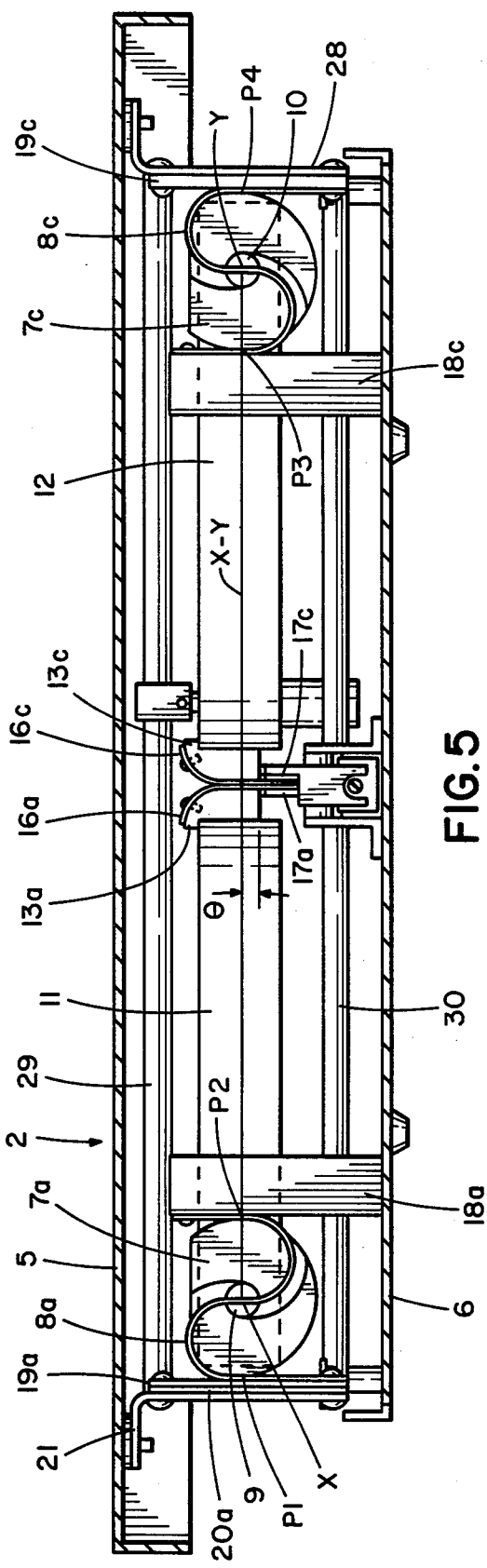
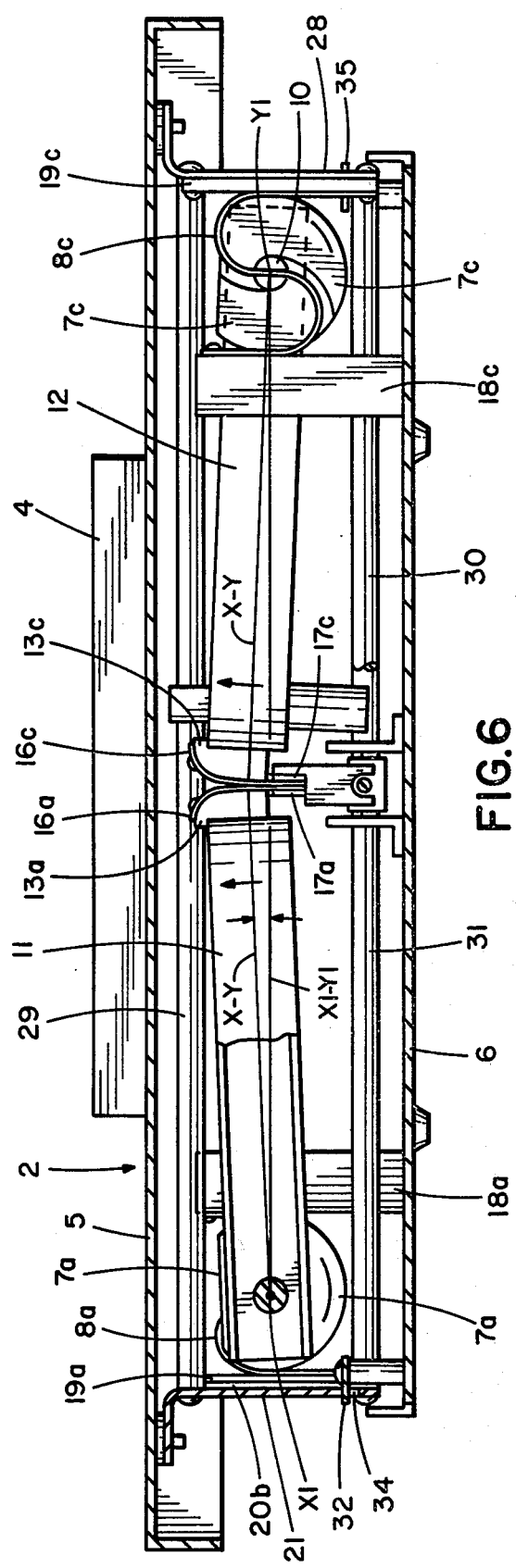

PULLEY AND TAPE MOTION LINKAGE FOR PLATFORM WEIGHING SCALE

BACKGROUND OF THE INVENTION

Platform weighing scales employing pulley and tape linkages to movably support the platform relative a base and also to actuate a weight responsive transducer element are known in the art. For example, such linkages are shown in U.S. Pat. Nos. 4,050,532, 3,938,603 and 2,736,549.

Many of the prior art tape and pulley linkage designs do not give an accurate readout in response to different platform weights. Additionally, these weighing scales may generate varying weight readings depending upon the location on the platform at which the load to be weighed is applied. A noncentered load on the platform tends to produce a reading which differs from that of a centered weight.

BRIEF SUMMARY OF THE INVENTION

Accordingly, a principal object of this invention is to improve the readout accuracy of platform scales employing pulley and tape linkages. This improved accuracy is maintained without regard to the location on the platform at which the load to be weighed is placed.

In general, the foregoing object is attained by a pulley and tape structural arrangement in which four sets of ratio pulley segments are employed. Each set of ratio pulleys has a large pulley segment and two small pulley segments. Improved weighing accuracy results because the operative portions of the metallic tapes are moved in circular paths which are defined by circular segments of the pulleys. The four small pulleys and their associated tapes directly control the movement of the platform relative the base of the scale.

Two ratio arms are provided. One ratio arm couples two small pulley segments to two large pulley segments. With this arrangement, minute vertical displacements of the small pulleys are translated through the ratio arm into amplified movement of the coupled large pulley segments. The amplified, but weight linear, movement of large pulley segments effects a linear movement of a weight responsive movable transducer element.

In the pulley and tape linkages of this invention, the small pulley segments are restrained by a pair of elements which sandwich each small pulley segment for a composite linear and rotary motion between parallel surfaces with only circular sectors of each pulley contacting the parallel surfaces. The small pulleys cannot therefore sway laterally with resulting weighing readout errors. In prior art designs, lateral swaying of the small pulleys produced a looseness in the tape connection to its associated small pulley segment which enabled the tape to deviate from diametric contact (180 degree contact with the circular small pulley surfaces). This deviation produced readout errors.

DETAILED DESCRIPTION OF THE DRAWINGS

In order that all of the structural features for attaining the objects of this invention may be readily understood, reference is made to the accompanying drawings wherein:

FIG. 5 is a section view taken along 5,6—5,6 of FIG. 4;

FIG. 6 is a view related to FIG. 5 modified to show the movement of the ratio arms in response to platform weight;

DESCRIPTION OF THE PREFERRED EMBODIMENT

Figure 1:
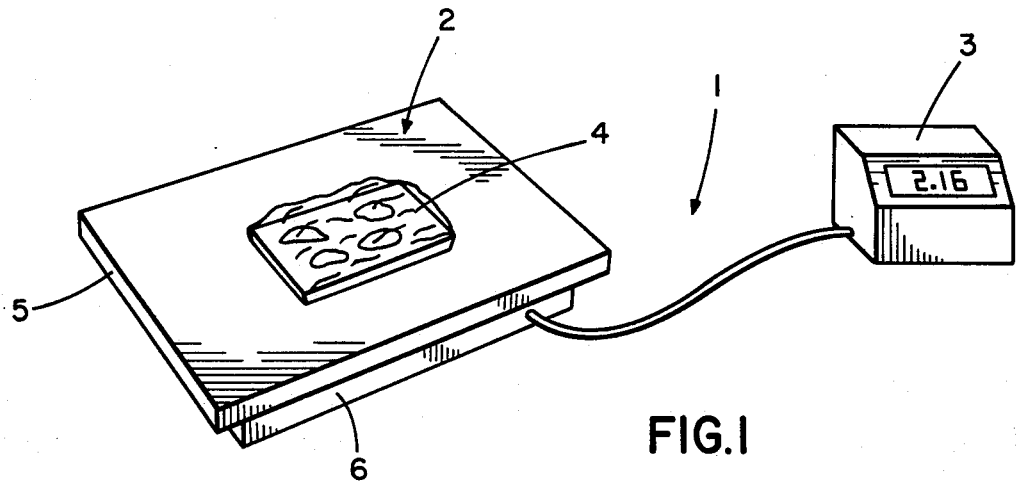
FIG. 1 is a view of the weighing scale of this invention showing the platform weighing unit in association with a digital readout module.

Referring to FIG. 1, the principal components of the platform-type weighing scale 1 to which the improvements of this invention are applied comprise platform weighing unit 2 and digital readout module 3. As is conventional in the art, item 4 to be weighed is placed on the platform of weighing unit 2 and the weight of the item is displayed digitally by module 3.

Figure 2:
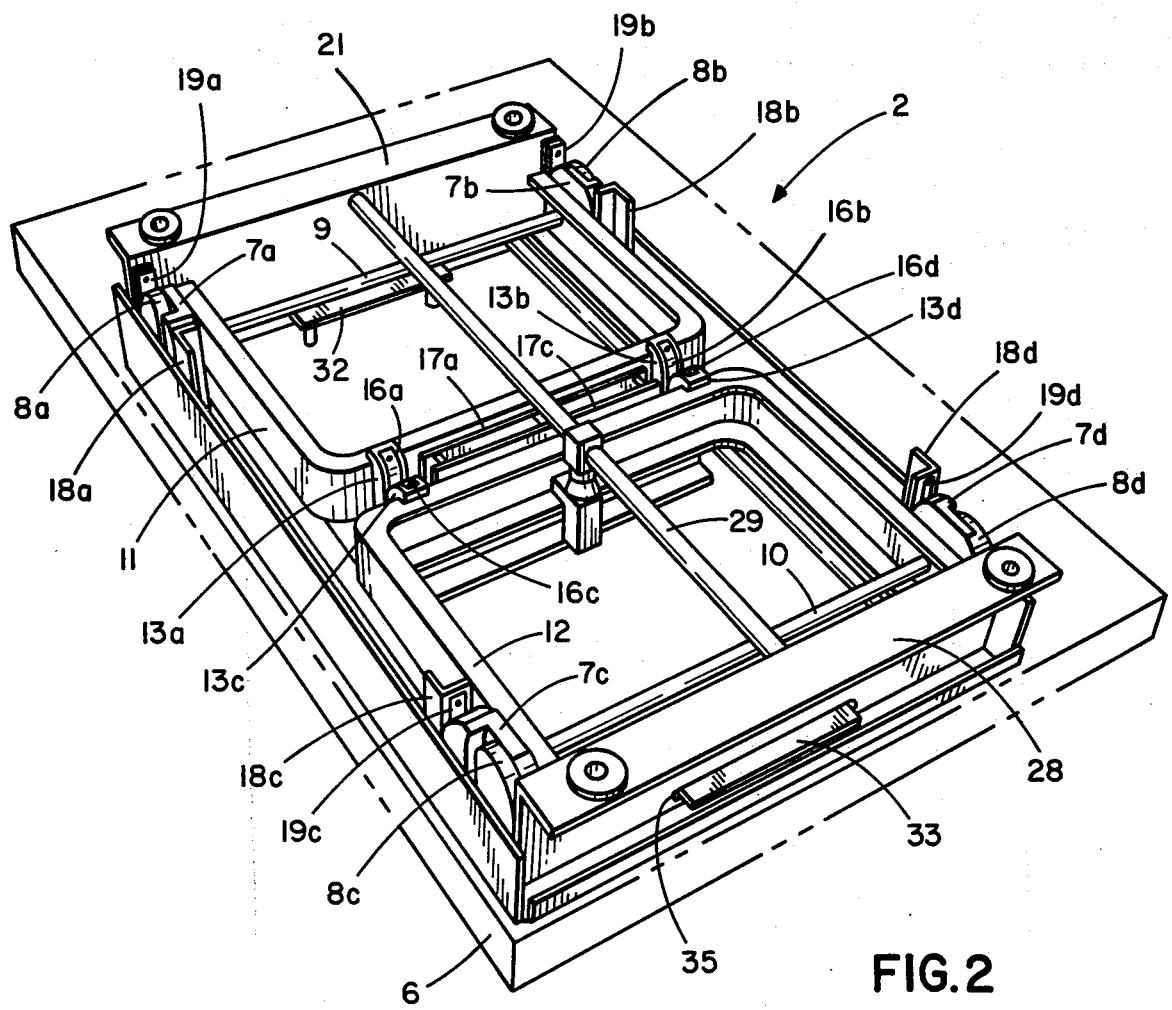
FIG. 2 is a perspective view of the weighing unit with the platform removed.
Figure 3:
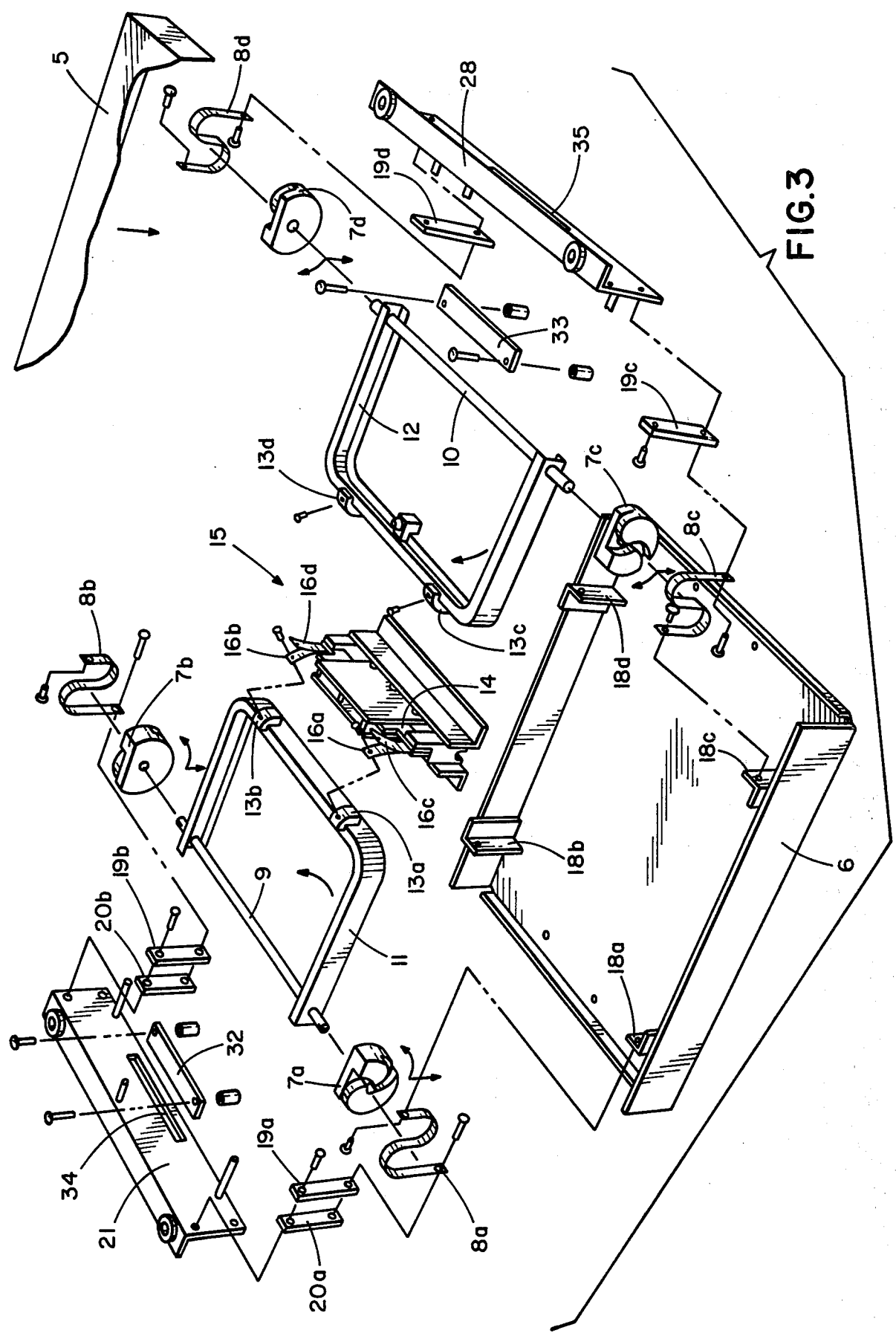
FIG. 3 is an exploded view of the components of FIG. 2.
Figure 4:
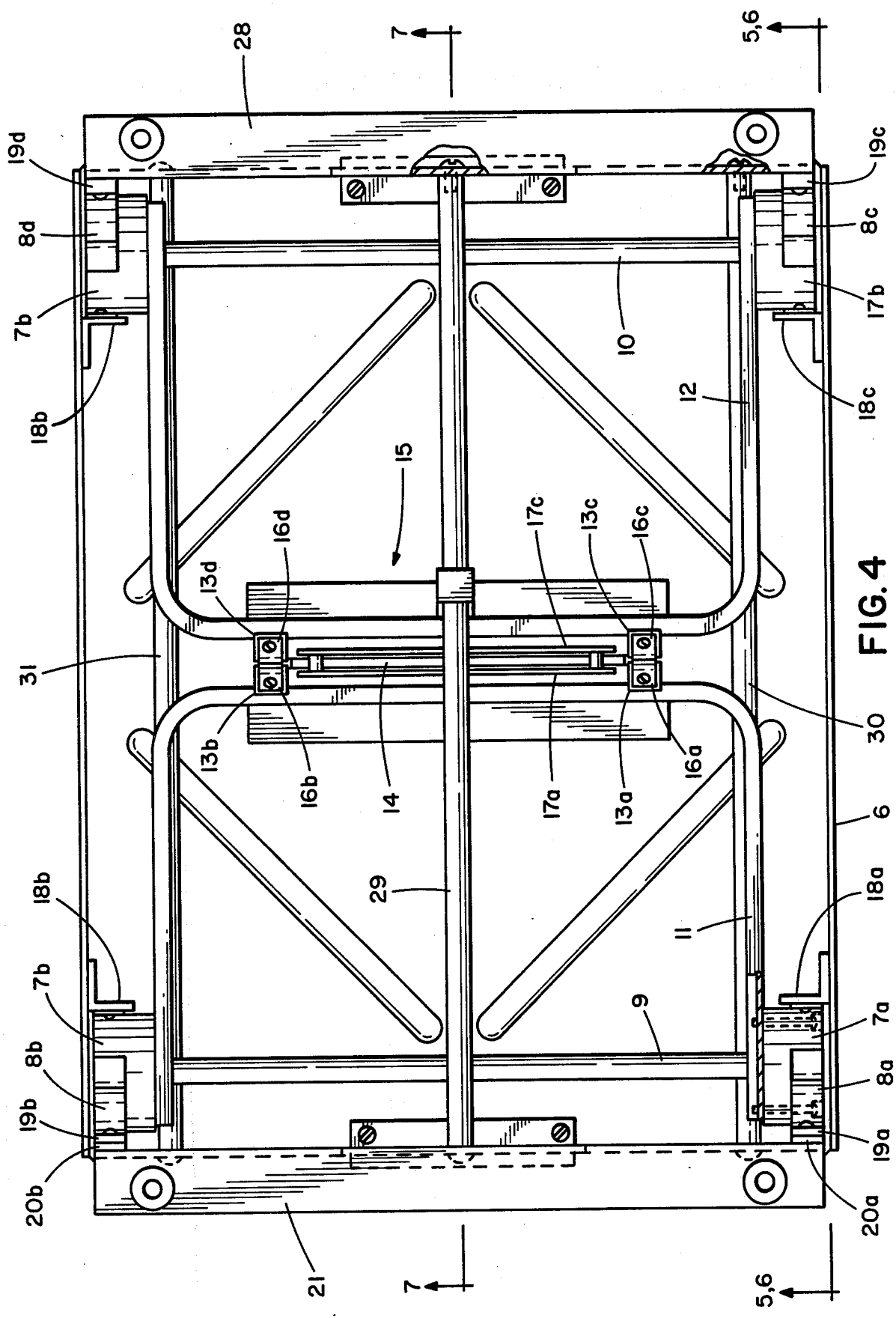
FIG. 4 is a plan view of the weighing unit with the platform removed.

Referring to FIGS. 2 and 3, a principal structural feature of this invention relates to a restrained ratio-pulley design by which platform 5 is movably supported relative base 6 of weighing unit 2 to effect movement of a transducer element. In general, this support is effected by a set of four small pulleys (segments) 7a, 7b, 7c and 7d which carry metallic tapes 8a, 8b, 8c and 8d, respectively.

The pulley-tape 7-8 subcombinations enable platform 5 to move responsively relative base 6 in accordance with the weight of a particular item 4. The pulleys 7a, b are fixedly carried on a ratio-arm shaft 9; and pulleys 7c, d are fixedly carried on a ratio-arm shaft 10. As is hereafter set forth in detail, the placement of weight 4 on platform 5 moves pulleys 7a, b, c, d in a restrained, composite downward linear and rotating movement. The composite movement of the pulleys and their associated shafts 9 and 10 produces an amplified composite linear and rotating movement of the extremities of U-shaped ratio-arms 11 and 12 which are fixedly attached to shafts 9 and 10, respectively.

Large pulley segments 13a and 13b are fixed to ratio-arm 11; and large pulley segments 13c and 13d are fixed to ratio-arm 12.

Small pulley segments 7a, b and their associated large pulley segments 13a, b cooperate as a restrained ratio pulley to operate in the manner hereafter set forth in detail. Similarly, small pulley segments 7c, d and their associated large pulley segments 13c, d also operate as a restrained ratio pulley.

The overall function of the ratio-pulley subcombinations 7-13 is to effect a weight responsive linear movement in an element 14 which is part of weight responsive transducer 15.

In the particular transducer 15 shown in the drawings, a movable capacitor element 14 is associated with a differential capacitor 15 having four stator elements 17a, b, c, d. The particular transducer is the subject matter of applicant's copending application Ser. No. 021,166, filed Mar. 15, 1979. For the purposes of this application, however, transducer 15 may be any type of device including a differential transformer or a strain gauge, which employs a movable element which when moved in a directly proportional relationship to the platform will translate weight responsive platform motion into a weight responsive electrical signal.

Movable capacitor element 14 is coupled to large pulley segments 13a, b, c, d by tapes 16a, b, c, d. Thus, in brief summary, a weight responsive downward movement of platform 5 produces a composite downward and rotating movement of small pulley segments 7a, b, c, d which in turn produce corresponding movements in ratio arms 11 and 12. The movements of ratio arms 11 and 12 cause an amplified composite movement of large pulley segments 13a, b, c, d. The movement of the large pulley segments produces a linear and weight responsive movement in transducer element 14 because of the coupling of this element by tapes 16a, b, c, d to large pulley segments 13a, b, c, d.

While the use of small pulley segments in a manner equivalent or identical to that of pulleys 7a, b, c, d in association with tapes 8a, b, c, d is old in the art, see for example U.S. Pat. Nos. 4,050,532 and 3,938,603, such prior art arrangements are not adequately linear in their readout in response to varying weights placed on the platform. Moreover, the prior art scales may generate varying weight readings depending upon location on the platform at which the load to be weighed is applied. For example, a non-centered load on the platform tends to produce a reading which differs from that of a centered weight. The set of ratio pulleys involving small pulley segments 7a, b, c, d and large pulley segments 13a, b, c, d improves the weighing accuracy because the operative portions of tapes 8a, b, c, d and 16a, b, c, d are moved in circular paths which are defined by circular segments of ratio pulleys.

Specifically, in the pulley-tape linkages of this invention, the pulleys are restrained so that the movement of each of pulleys 7a, b, c, d is defined by a pair of elements which sandwich each small pulley 7a, b, c, d for a composite linear and rotary motion between parallel surfaces, which are formed by the tape support posts 18a, b, c, d and the restraint plates 19a, b, c, d. It has been found essential to improved accuracy that the tapes cooperating with each small pulley segment diametrically contact the circular sectors, and that any looseness in the tape connection to its associated pulley which enables the tape to deviate from diametric, i.e., 180 degree contact with the circular surface results in readout variations which are unacceptable where stringent scale accuracy is required.

Some of the critical design factors involving the small ratio-pulley segments 7a, b, c, d and large ratio-pulley segments 13a, b, c, d, are explained by referring to FIGS. 5 and 6. In FIG. 5, platform 5 supports no weight; whereas, in FIG. 6, platform 5 supports weight 4. Inasmuch as small pulley segment 7a is mounted on ratio-arm shaft 9, the center of composite rotary and linear motion of small pulley segment 7a is x; similarly, inasmuch as small pulley segment 7c is mounted on ratio-arm shaft 10, the center of composite rotary and linear motion for small pulley segment 7c is y. The center points x and y lie on the longitudinal axes of ratio-arm shafts 9 and 10, respectively. Line x-y extends from point x to point y. The centermost portion of line x-y passes through large pulley segments 13a and 13c.

It should also be noted that tape 8a and tape 8c each make tangential contact twice with each of small pulley segments 7a and 7c, respectively, along line x-y and extension of this line at points $p_1$, $p_2$, $p_3$ and $p_4$. Points $p_1$ and $p_2$ are on diametrically opposite circular sectors of small pulley segment 7a and these points define points at which the tape is tangential to these circular sectors. An identical situation exists with respect to points $p_3$ and $p_4$ with respect to small pulley segment 7c. The diametric contact of tape 8a on small pulley segment 7a is assured by sandwiching the pulley segment 7a between tape support post 18a and restraint plate 19a and small pulley segment 7c between tape support post 18c and restraint plate 19c. The parallel gap defined by these elements assures diametric tape contact.

In order to overcome excessive manufacturing tolerances which would inevitably exist in large production runs, an elongated rubber sheet 20a which acts as a preload spring is sandwiched between restraint plate 19a and side plate 21 for base 6 (see FIG. 3). Similarly, rubber preload spring 20b is sandwiched between restraint plate 19b and side plate 21. The elastic characteristic of preload springs 20a and 20b serves to effect and maintain a tight sandwiching of pulley segment 7a between elements 18a and 19a, pulley segment 7b between elements 18b and 19b, pulley segment 7c between elements 18c and 19c and pulley segment 7d between elements 18d and 19d. This tight sandwiching assures that the tapes form a diametric contact previously outlined with respect to points $p_1$, $p_2$, $p_3$ and $p_4$.

When weight 4 is placed upon platform 5, small pulleys 7a and 7c (referring to FIG. 6) move downwardly in response to the downward movement of ratio-arm shafts 9 and 10. Additionally, pulley 7a rotates counterclockwise and pulley 7b rotates clockwise so that points $x_1$ and $y_1$ located on the longitudinal axis of ratio-arm shafts 9 and 10 now define a new line $x_1y_1$ which passes through the lowermost portions of large pulley segments 13a and 13c. The angular sectors defined by lines xy and $x_1y_1$ with respect to each of the small pulley segments 7a, b, c, d, and also the angular sectors that these lines define on large pulley segments 13a, b, c, d, are the operative portions of the pulley segments. These operative angular sectors must be circular in peripheral contour; for example, the operative sectors of small pulley segments 7a and 7b must be circular with respect to the center of rotation x,$x_1$ and the operative sectors of small pulley segments 7c and 7d must be circular with respect to a center of rotation y,$y_1$. Similarly, the operative sectors of large pulley segments 13a and 13b must be circular with respect to the center of rotation x,$x_1$ and the operative sectors of large pulley segments 13c and 13d must be circular with respect to the center of rotation y,$y_1$. The remaining pulley surfaces are technically inoperative and therefore need not be perfectly circular. From a practical aspect, however, it is desirable to fabricate the circular sectors of all pulleys somewhat larger than the minimum angle required.

Figure 7:
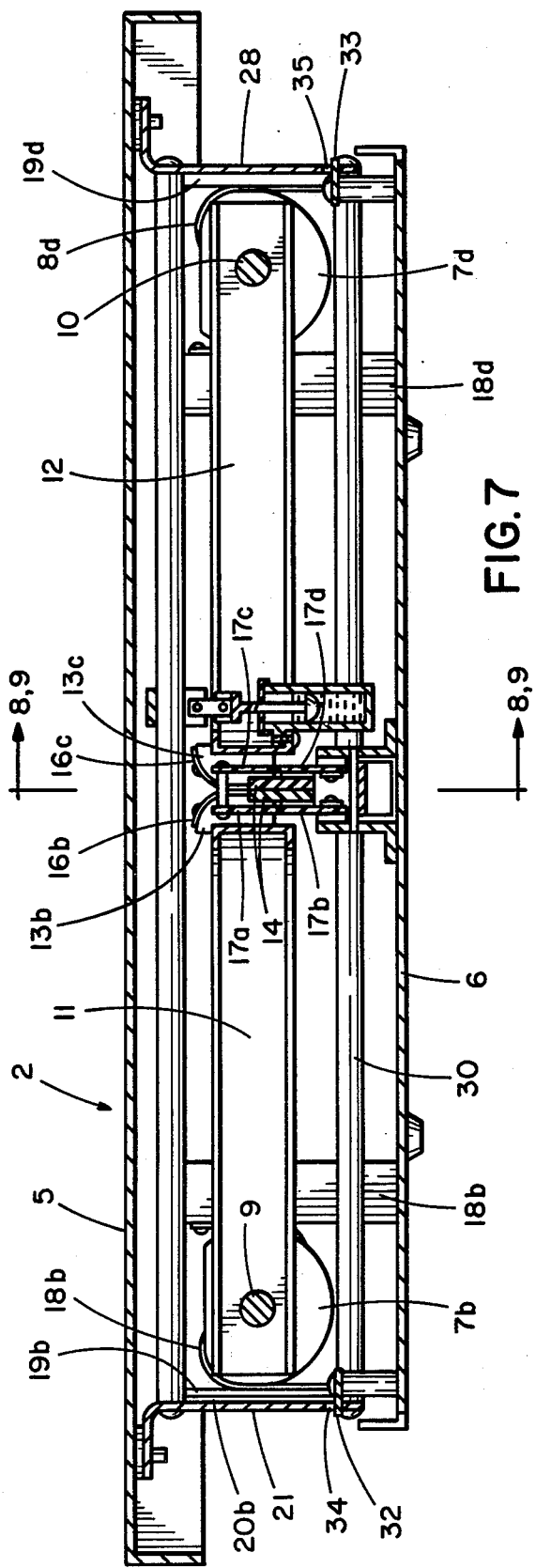
FIG. 7 is a section view taken along line 7—7 of FIG. 4, (with the platform included) which shows sectional details of a preferred differential capacitor transducer.
Figure 8:
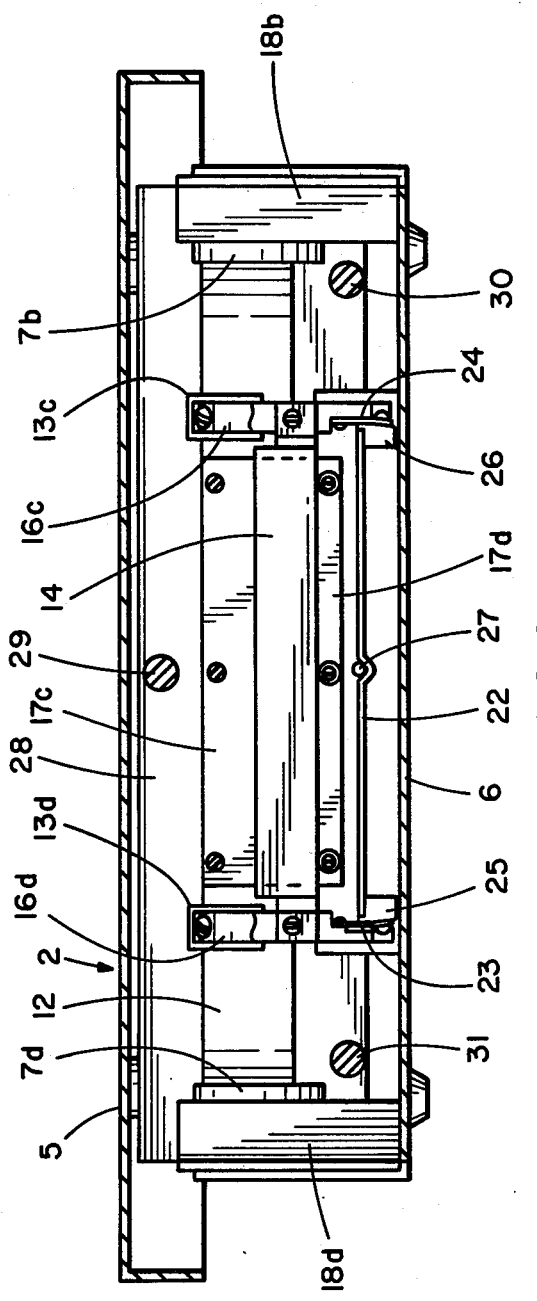
FIG. 8 is a section view taken along line 8,9—8,9 of FIG. 7 which shows details of the capacitor elements and the flat restraining spring for the movable capacitor element.

FIG. 7 is a view that corresponds to FIG. 5 in that no weight is shown on platform 5. In FIG. 7, ratio arms 11 and 12 actuate movable transducer element 14 with respect to stator elements 17a, b, c and d. It should be noted that the movable transducer element is restrained by flat spring 22 (FIG. 8), the left terminal end of which is coupled to the left end of transducer element 14 by tape 23, and the right end of spring 22 is coupled to the right end of transducer element 14 by tape 24. Both transducer tapes 23 and 24 move about tape support blocks 25 and 26. The center portion of flat spring 22 is retained in a fixed position by an anchor pin 27.

Figure 9:
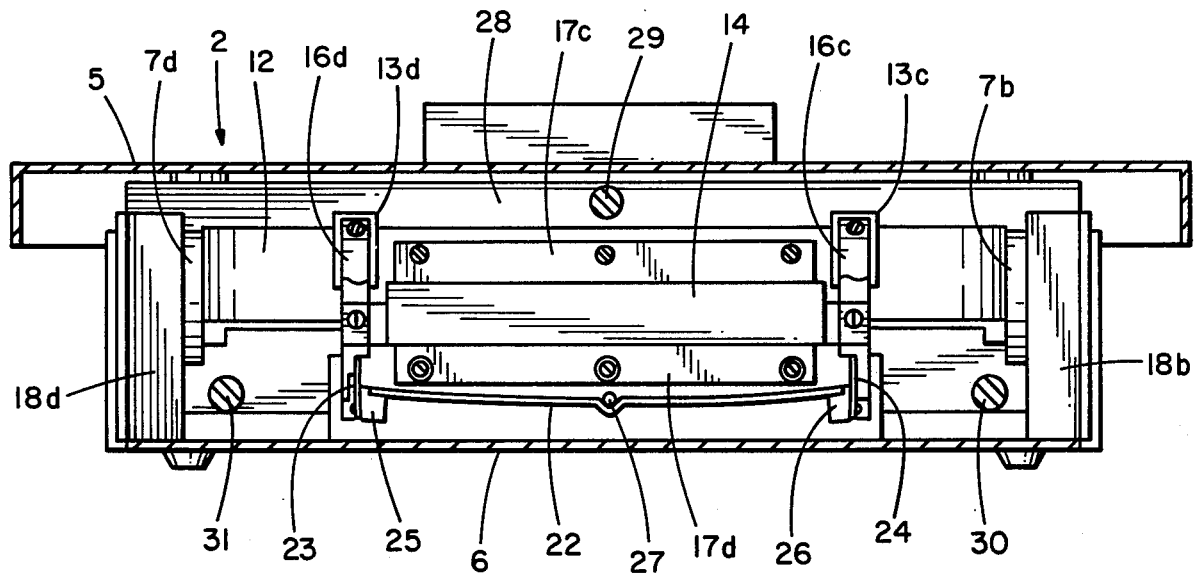
FIG. 9 is a view related to that of FIGS. 6 and 8 in which the movement of capacitor components is shown in response to platform weight.

FIG. 9 relates to FIG. 6 in that both figures show the movement of transducer components in response to weight 4. FIG. 9 shows the upward movement of transducer element 14 accompanied by corresponding bending of both ends of flat spring 22. The detailed construction and mode of operation of differential capacitor 15 of which element 14 is a part is described in applicant's copending application previously identified.

Figure 10:
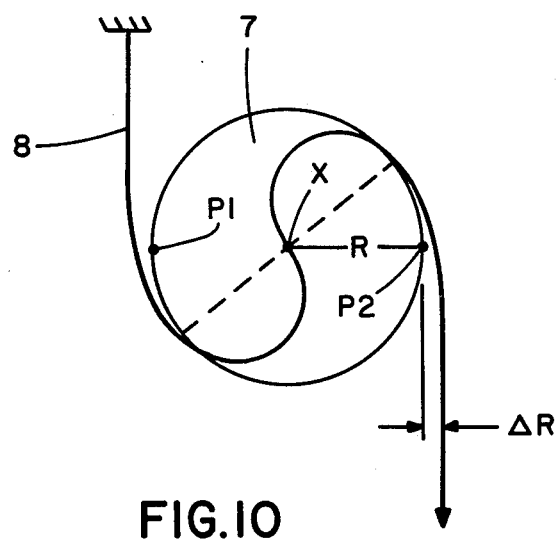
FIG. 10 is a drawing of assistance in understanding the function of the small pulley restraining elements of this invention.

FIG. 10 is a diagram which shows the errors that are induced when tape 8 is not appropriately restrained relative small pulley segment 7. In particular, the diametric points $p_1$ and $p_2$, which correspond to points $p_1$, $p_2$, $p_3$, $p_4$ previously identified with reference to FIG. 5, should be in tangential contact with the adjacent portions of tape 8. However, due to slackness in tape 8, the adjacent sections of the tape are removed from points $p_1$ and $p_2$ by an incremental distance delta R. Accordingly, if the radius of the operative sector of pulley 7 is R, then the radius of the adjacent operative portion of tape 8 is R+delta R. In prior art designs, delta R is a weight dependent variable (unless the tape is restrained so as to tangentially contact points $p_1$ and $p_2$ as previously outlined). In general as the weight of item 4 is lessened on platform 5, delta R becomes increasingly greater. In any event, this variation in the small pulley arm through variations in the length of the increment delta R produces inaccuracies which cannot be tolerated in a scale in which extreme accuracy is required. Accordingly, as previously set forth, restraint plates 19 and anchor posts 18 defined a parallel restraining gap which eliminates the variable distance delta R and causes the operative portions of tape 8 to be in tangential contact with diametric opposite points p of the small pulleys.

Referring to FIGS. 2, 4, 7, 8, the movable elements comprising pulley 7, ratio-arm shafts 9 and 10, and ratio arms 11 and 12 are movably supported on a pair of side plates 21 and 28. Side plates 21 and 28 are fixed to one another by connecting rods 29, 30 and 31. The side plates are movably supported relative base 6 by pulley-tape subcombinations 7–8 so that the side plates are able to move downwardly together with the platform in response to the placement of weight 4 on the platform 5. The corresponding composite motion of small pulley segments 7a, b, c, d produces a corresponding composite motion in ratio arms 11 and 12 as previously described. The resulting variation in the differential capacitor due to the change in the relative position of the movable transducer element 14 with respect to the stationary capacitor elements 17a, b, c, d, produces a capacitor variation which produces a weight responsive readout in unit 3.

Each of side plates 21 and 28 cooperate with motion limiting plates 32 and 33 which operate in slots 34 and 35 in such a manner that downward movement of side plates 21 and 28 is ultimately restrained by limiting plates 32 and 33.

It should be understood that the above described arrangements are merely illustrative of the principles of this invention and that changes can be made without departing from the scope of the invention. For example, while elements 8 have been previously described as metallic tapes, they could of course be wires, cables or any other non-stretchable flat-like or wire-like material. Similarly, it is not essential that these tapes be unitary. Each tape 8a, b, c, d, for example, could be two tapes each of which is anchored to non-circular inoperative portions of its adjacent small pulley 7a, b, c, d. Likewise, differential capacitor 15 can be any type of transducer available in the electrical art which employs a movable transducer element that can be connected to generate a weight responsive signal. In addition, an all mechanical transducer may replace the differential capacitor type transducer, for weight readout for instance, by a dial indicator.

What is claimed is:

1. In a platform weighing scale having a transducer with a movable element to translate weight responsive platform motion into a weight responsive reading and in which the platform is movably supported relative a scale base by one or more pulley and tape motion linkages which also actuate the transducer element, the improved pulley and tape motion linkage comprising a pulley-like element having diametrically opposite peripheral circular sectors, tape means contacting the circular sectors and connected between the platform and base, a pair of restraining elements sandwiching the pulley-like element and the tape for a composite rotary and linear motion between parallel surfaces with tape portions adjacent the circular sectors contacting the parallel surfaces.

2. The combination of claim 1 in which the tape means is divided into two operative sections.

3. The combination of claim 1 comprising preload spring means forcing the restraining elements against the tape.

4. The combination of claim 1 in which the restraining elements are spaced to define a uniform gap between parallel surfaces.

5. The combination of claim 1 in which one of the restraining elements is a tape support post.

6. The combination of claim 5 in which the second restraining element is a plate.

7. The combination of claim 6 in which the restraining elements are spaced to define a uniform gap between parallel surfaces.

8. In a platform weighing scale having a transducer with a movable element to translate weight responsive platform motion into a weight responsive electrical signal and in which the platform is movably supported relative a scale base by one or more pulley and tape motion linkages which also actuate the transducer element, the improved pulley and tape motion linkage comprising a pulley-like element having diametrically opposite peripheral circular sectors, a tape contacting th circular sectors and connected between the platform and base, a pair of restraining elements sandwiching the pulley-like element for a composite rotary and linear motion between parallel surfaces with the circular sectors contacting the parallel surfaces, an arm fixedly coupled to the pulley-like element at its center of rotation by which a remote segment of the arm follows an amplified composite linear and rotary motion, a second pulley-like element fixed to the remote segment of the arm and having a peripheral circular sector having the same center of rotation as the first pulley-like element, a second tape contacting the second circular sector and connected between the arm and the movable element of the transducer.

9. The combination of claim 8 comprising two ratio-arms, four small pulley-like elements each having an associated tape, and four large pulley-like elements each having an associated tape, each of the ratio-arms movably actuating two large pulley-like elements and their associated tapes with the four tapes of the large pulley-like elements being coupled to a movable transducer element disposed between the ratio arms, and each of the ratio arms being coupled to two small pulley-like elements whereby the movable transducer element is moved by the two ratio arms responsively to weight placed on the scale.

* * * * *